United States Patent [19]

Iwamoto et al.

[11] Patent Number: 4,560,280
[45] Date of Patent: Dec. 24, 1985

[54] APPARATUS FOR OPTICALLY MEASURING THE DISTANCE BETWEEN TWO GRATING-LIKE STRUCTURES AND THE SIZE OF PERIODIC PATTERN ELEMENTS FORMING ONE OF THE GRATING-LIKE STRUCTURES

[75] Inventors: Akito Iwamoto, Kamakura; Hidekazu Sekizawa, Yokohama, both of Japan

[73] Assignee: Tokyo Shibaura Denki Kabushiki Kaisha, Kawasaki, Japan

[21] Appl. No.: 523,768

[22] Filed: Aug. 17, 1983

[30] Foreign Application Priority Data

Aug. 31, 1982 [JP] Japan .................................. 57-149981
Aug. 31, 1982 [JP] Japan .................................. 57-149982

[51] Int. Cl.$^4$ ........................ G01B 11/02; G01B 11/14
[52] U.S. Cl. .................................... 356/375; 356/372; 356/374
[58] Field of Search ............... 356/372, 373, 374, 375, 356/382, 387, 355, 356; 250/237 G

[56] References Cited

FOREIGN PATENT DOCUMENTS 55-33679 3/1980 Japan .

OTHER PUBLICATIONS

J. Inst. Tv. Eng. of Japan 34, #2, pp. 141–146, (1980), "Automatic Inspection Method for Black Matrix-Screens of Color Picture Tubes".

Primary Examiner—R. A. Rosenberger
Assistant Examiner—Michael Vollero
Attorney, Agent, or Firm—Oblon, Fisher, Spivak, McClelland & Maier

[57] ABSTRACT

The distance between first and second grating-like structures such as a shadow mask and a faceplate of a color picture tube or the size of pattern elements of the second grating-like structure such as black stripes formed on the inner surface of the faceplate is optically measured. The shadow mask has a periodic pattern of apertures or slots and the faceplate has a periodic pattern of the black stripes. An optical system located between a light source and an assembly of the first and second grating-like structures applies parallel rays of light to the assembly and is arranged to vary an incident angle of the parallel rays to the assembly. A photodetector detects the quantity of light passed through the assembly to produce an electric signal whose amplitude periodically varies with variation in the incident angle of the parallel rays to the assembly. A signal processing unit evaluates the distance between the first and second grating-like structures or the size of pattern elements forming the second grating-like structure on the basis of the electric signal from the photodetector.

10 Claims, 16 Drawing Figures

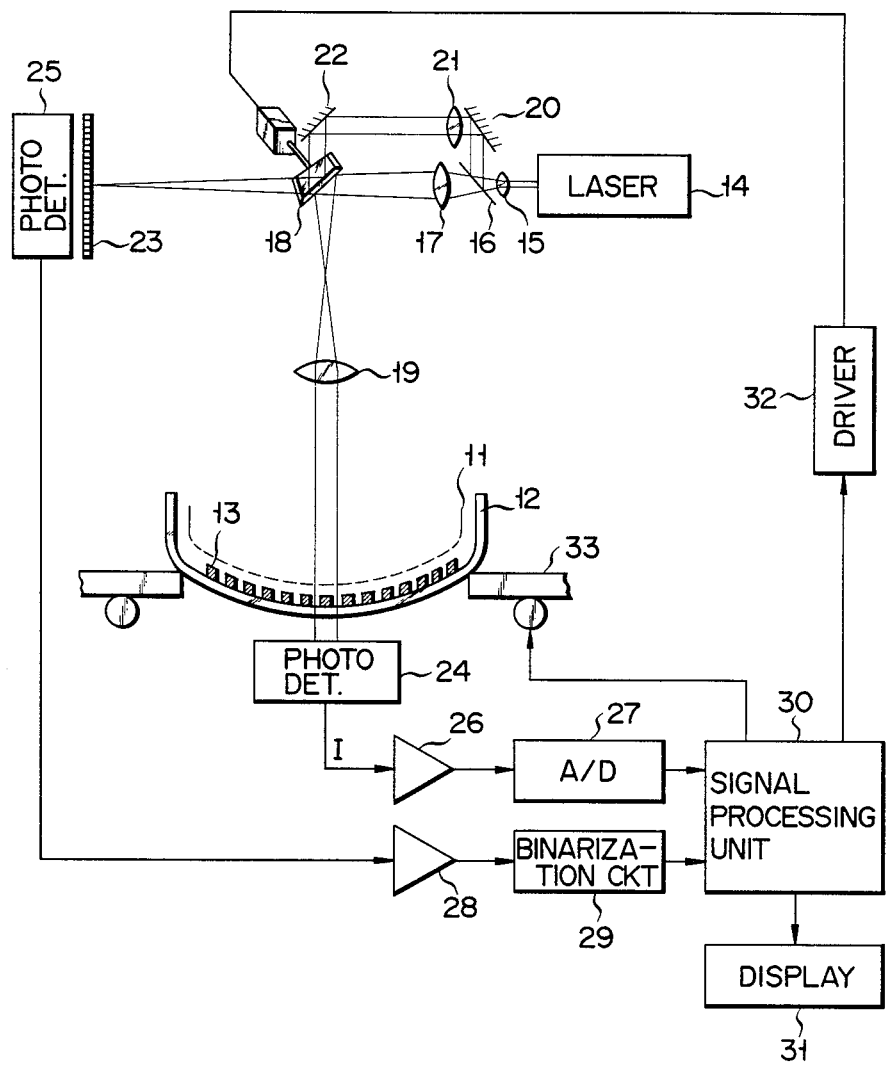
F I G. 1

F I G. 4
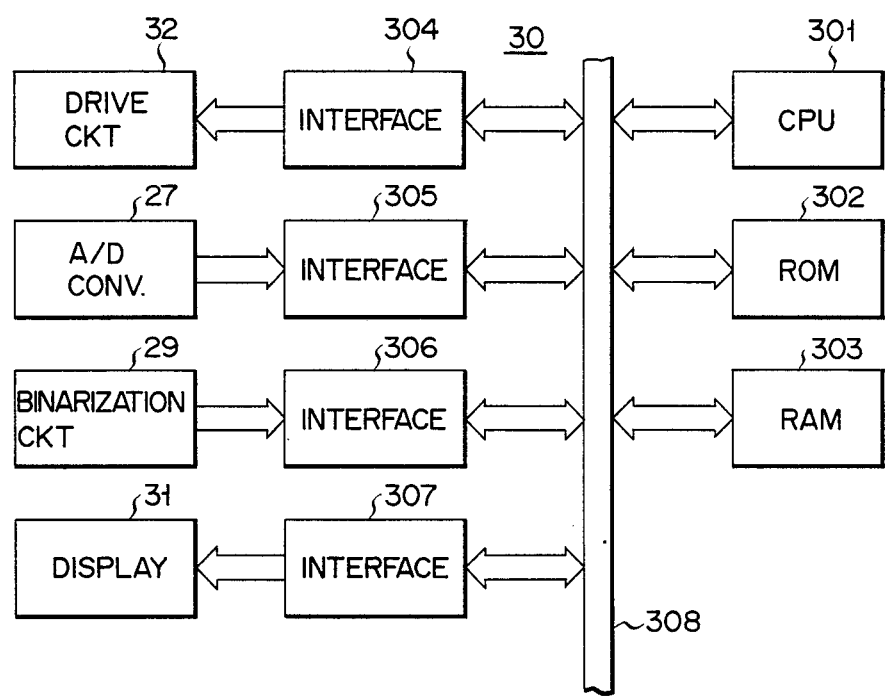

APPARATUS FOR OPTICALLY MEASURING THE DISTANCE BETWEEN TWO GRATING-LIKE STRUCTURES AND THE SIZE OF PERIODIC PATTERN ELEMENTS FORMING ONE OF THE GRATING-LIKE STRUCTURES

BACKGROUND OF THE INVENTION

This invention relates to an apparatus for optically measuring the distance between two grating-like periodic structures and/or the size of the pattern elements of one of the grating-like structures. By way of example, the two grating-like structures are a shadow mask and a faceplate of a color picture tube.

A color picture tube comprises a panel section having a phosphor screen formed on the inner surface of a faceplate and a shadow mask mounted by panel pins at a predetermined distance from the phosphor screen, and a funnel section having a three-electron gun assembly at one end thereof. The panel section has its shadow mask mounted thereon after the formation of the phosphor screen on the inner surface of the faceplate and is then sealed to the funnel section. The phosphor screens of present-day color picture tubes can be classified into a tri-color phosphor dot type and a tri-color phosphor stripe type. To enhance the quality of a reproduced picture, two types of phosphor screens have recently been developed: a black matrix screen in which a black, nonfluorescent material is buried between phosphor dots and a black stripe screen in which a black, nonfluorescent material is buried between vertical phosphor stripes. As the shadow mask, a circular-aperture mask is used for phosphor dot screen and a slotted mask is used for the black stripe screen.

For the black stripe type color picture tube, the width of the respective phosphor stripes is determined by the interval between the black stripes. Thus, the respective phosphor stripes need not be formed with high accuracy in width because they are formed after the black stripes have been formed. Thus, for the black stripe tube, a better white uniformity is obtained without the need of forming the respective phosphor stripes with high precision. In the case of the black stripe tube, however it is indispensable to check whether or not the black stripes are accurately formed. Since a distance between the shadow mask and the inner surface of the faceplate also imparts an influence to the reproduced picture quality, it is important to precisely control the distance to a prescribed value. Therefore, a picture tube production line must be equipped with an automated apparatus which can detect the width/spacing of the black stripes (the pattern measurement) and/or can measure distance between the shadow mask and the phosphor screen.

A method has been known which measures a narrow clearance (distance) by using an air micrometer. According to this method, the air micrometer is inserted into a clearance to be measured and the clearance is measured by supplying air to the micrometer and measuring the back pressure of the air. Since, with this method, it is necessary to insert the micrometer into the clearance, if it is used in a color picture tube measurement, both the shadow mask and faceplate are likely to be damaged. This is a serious drawback for this method to be used in an automated manufacturing process.

A Japanese Patent laid-open specification No. 55-33679 discloses an apparatus to measure a spatial distance by moiré fringes resulting from an interference between a projection grating and a reference grating. Since the apparatus measures the distance through the variation of an angle or a pitch of the moiré fringes, a detector is required to be of a two-dimensional type like an image pick-up tube. This complicates the apparatus as well as the signal processing method.

A pattern measuring apparatus is disclosed in a Japanese Patent laid-open specification No. 55-27321. The apparatus is adapted to direct a laser beam to a pattern to be measured, subject a transmitted or reflected beam to a Fourier transformation and measure the pattern width on the basis of the intensity of a predetermined frequency component in the Fourier transform pattern. The apparatus has advantages in that it does not need to focus the laser beam onto the pattern to be measured and that it is possible to readily find an average value of pattern within the diameter of the laser beam. However, this measuring method is not applicable to measuring a pattern which is printed on an optically inhomogeneous diffusion plate such as ground glass or an opaque medium such as paper, since the S/N ratio of the Fourier transform pattern is low.

For the measurement of a black stripe pattern of a color picture tube, the Journal of the Institute of Television Engineers of Japan 34, No. 2, PP 141 to 146, (1980) discloses an apparatus adapted to scan the black strip pattern with a fine laser beam and measure the width of the black stripe on the basis of a time interval of portions of an electric signal corresponding to the black stripes which is obtained by detecting the transmitted light. In this apparatus, it is difficult to narrow the laser beam substantially negligible to the black stripe width. Furthermore, an error is liable to occur during the pattern width information extracting process from the electric signal. For the laser beam to be uniformly focused on the pattern to be measured, it is necessary to accurately set the scanning center of the laser beam to be positioned at the curvature center of the faceplate of the color picture tube.

SUMMARY OF THE INVENTION

An object of this invention is to provide an improved apparatus for optically measuring the distance between two grating-like structures each having light-transmissive or light-impermeable, periodic pattern elements or the size of the pattern elements of one of the two grating-like structures.

Another object of this invention is to provide an improved apparatus for optically measuring a shadow mask-to-faceplate distance, as well as an average pattern size of a phosphor screen on the inner surface of the faceplate.

Still another object of this invention is to provide an apparatus for optically and accurately measuring a shadow mask-to-faceplate distance, as well as the pattern size of a phosphor screen, such as the width of black stripes on the inner surface of the faceplate, at a high speed and with a simple arrangement.

According to this invention, between a light source and an assembly to be measured including first and second grating-like structures each having light-transmissive or light impermeable, periodic pattern elements, an optical system is disposed which applies parallel rays of light to the assembly and is arranged to vary an incident angle of the parallel rays to the assembly. A photodetector is provided to detect the quantity of light transmitted through the assembly and produce an electric signal whose amplitude periodically varies with variation in the incident angle of the parallel rays to the assembly due to the periodicity of the pattern elements. A signal processing unit drives the optical system to vary the incident angle of parallel rays to the assembly and evaluates the distance between the first and second structures or the size of pattern elements of one of the first and second structures on the basis of the electrical signal from the photodetector.

In the case of a color picture tube, the first grating-like structure corresponds to a shadow mask having a periodic pattern of round apertures or slots (light-transmissive grating elements), and the second grating-like structure corresponds to a faceplate having a phosphor screen formed on the inner surface thereof, the phosphor screen having a periodic pattern of black stripes (light-impermeable grating elements) or phosphor dots (light-transmissive grating elements) embedded between black material.

To measure the distance between the first grating-like structure (shadow mask) and the second grating-like structure (faceplate), the signal processing unit evaluates the distance between the first and second structures on the basis of an amount of variation in the incident angle of the parallel rays of light on the first structure during which the electric signal from the photodetector experiences N (an integer) cycle of periods.

To measure the pattern size (pattern element size) of the second structure, the signal processing unit calculates the ratio between maximal and minimal amplitude values of the electric signal from the photodetector during one cycle period thereof and evaluates the pattern size from a conversion table relating to the pattern sizes and the experimental ratios, which is fixed in advance from the experiment.

BRIEF DESCRIPTION OF THE DRAWING

FIG. 1 is a diagrammatic view showing an apparatus according to this invention which measures a shadow mask-to-faceplate distance;

FIG. 4 shows an arrangement of a signal processing unit of FIG. 1;

DETAILED DESCRIPTION OF THE PREFERRED EMBODIMENTS

Figure 2:
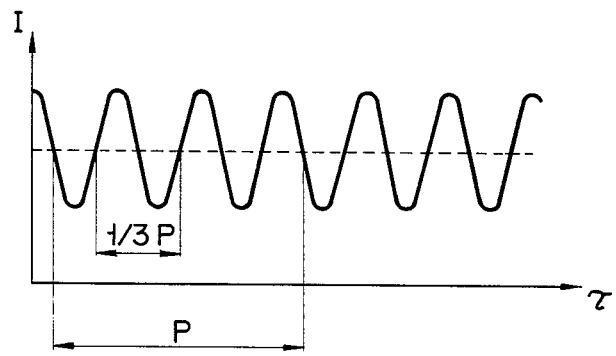
FIG. 2 shows an electric signal of a detector for detecting quantity of light beam passed through the faceplate.

An apparatus for measuring a shadow mask to faceplate distance of a color picture tube will now be described with reference to FIG. 1.

For a black stripe type color picture tube, as is well known, a number of slots are formed at a pitch P on a shadow mask 11, in the horizontal direction of a faceplate 12. Vertical black stripes 13 are formed at a pitch ⅓ P on the inner surface of the faceplate 12.

As shown in FIG. 1, a light beam from a laser 14 is conducted through a first lens 15 to a half mirror 16 where it is separated into a reflected light component and a transmitted light component. The transmitted component from the half mirror 16 is conducted through a second lens 17 to a galvanometer mirror 18 having reflecting mirrors on its both surfaces, where it is reflected toward an assembly of the shadow mask 11 and faceplate 12. Thus, the transmitted component passed through the second lens 17 is focused at the focal point of a third lens 19 positioned between the galvanometer mirror 18 and the shadow mask/faceplate assembly after being reflected by the galvanometer mirror 18. Thus, the shadow mask/faceplate assembly is illuminated with a parallel light beam from the third lens 19.

The reflected component from the half mirror 16 is reflected by a first fixed reflecting mirror 20 and directed through a fourth lens 21 to a second fixed reflecting mirror 22. The laser beam passed through the fourth lens 21 is reflected downward by the second fixed reflecting mirror 22 and directed to a glass scale 23 after it is reflected on the reflecting surface of the galvanometer mirror 18 which is opposite to that reflecting surface of the galvanometer mirror where the transmitted component is reflected. The glass scale 23 is placed at the position where the laser beam passed through the fourth lens 21 is focused.

The transmitted component passed through the half mirror 17 is directed by the galvanometer mirror 18 to the shadow mask/faceplate assembly to be used for the measurement of the distance between the shadow mask 11 and the faceplate 12. On the other hand, the reflected component from the half mirror 16 which is directed to the glass scale 23 by the galvanometer mirror 18 is used in detecting the rotational angle of the galvanometer mirror 18, i.e., the incident angle of the parallel laser beam on the shadow mask/faceplate assembly.

First and second photodetectors 24 and 25 are disposed, the former being adapted to detect the laser beam passed through the shadow mask/faceplate assembly and the latter, the laser beam passed through the glass scale 23. An electric signal from the first photodetector 24 which corresponds to the intensity of detected light is supplied through an amplifier 26 to an analog-to-digital (A/D) converter 27 to be converted to a digital signal corresponding to the intensity of the detected light. An electric signal from the second photodetector 25 is delivered through an amplifier 28 to a binarization circuit 29, such as a Schmitt trigger circuit, to produce pulse outputs the number of which corresponds to the rotation angle of the galvanometer mirror 18. The outputs of the A/D converter 27 and binarization circuit 29 are supplied to a signal processing unit 30. As set out below, the unit 30 evalutes the shadow mask-to-faceplate distance on the basis of the outputs of the A/D converter 27 and binarization circuit 29 and the result of measurement is displayed on a display unit 31. The signal processing unit 30 drives the galvanometer mirror 18 through a drive circuit 32 to vary the incidence angle of the parallel laser beam at the shadow mask-to-faceplate assembly.

As set out above, the shadow mask 11 has slots arranged at the pitch P in the horizontal direction, while the faceplate 12 has black stripes arranged in one third of that pitch P. Thus, according to this invention, first and second periodic grating patterns are illuminated with the parallel laser beam. Even if the laser beam has a beam diameter corresponding to several times the pitch P, the quantity of light received at the detector 24 becomes minimal when the laser beam illuminates the black stripes and becomes maximal when the laser beam illuminates the phosphor stripes between the black stripes. Therefore, as shown in FIG. 2, an output signal having a period of ⅓ P is obtained from the photodetector 24 by varying the incidence angle of the laser beam on the shadow mask 11.

Figure 3:
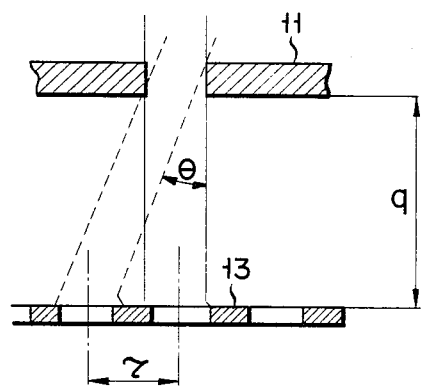
FIG. 3 is a view showing a principle on which a shadow mask-to-faceplate distance is measured.

A relationship between the incidence angle of the parallel laser beam and the shadow mask-to-faceplate distance will be quantitatively discussed below with reference to FIG. 3.

Supposing that the incidence angle of the laser beam on the shadow mask 11 is inclined through an angle $\theta$ with respect to the normal direction of the shadow mask by the rotation of the galvanometer mirror, the distance $\tau$ of shifting of the laser beam on the black stripe pattern is given by $$\tau = q \tan \theta \qquad (1)$$

where q stands for the distance between the shadow mask and the faceplate. If the amount of shifting of the laser beam is equal to the pitch P of the slots of the shadow mask 11, then $$P = q \tan \theta \qquad (2)$$

From Equation (2) it will understood that, if the value of $\theta$ can be known, the distance q is readily obtained using the known value P.

To detect the angle $\theta$, the optical system extending from the half mirror 16 up to the glass scale 23 is used in this embodiment. The optical system is so arranged that the laser beam from the laser beam source 14 can be focused on the glass scale 23. The laser beam on the glass scale 23 is shifted according to the rotation of the galvanometer mirror 18. Grooves corresponding to graduations are provided on the glass scale 23. When the laser beam is incident on a groove of the glass scale, it is scattered, failing to reach the photodetector 25. When, on the other hand, the laser beam is incident on a portion between the grooves, it passes through the glass scale 23, reaching the photodetector 25. With the shifting of the laser beam on the glass scale 23, therefore, the photodetector 25 delivers corresponding output pulses to the binarization circuit 29 so that they are converted to a binary signal suitable to be processed by the signal processing unit 30.

Supposing that the rotation angle of the galvanometer mirror corresponding to the incidence angle of the laser beam on the shadow mask 11 is $\theta$, the distance between the galvanometer mirror 18 and the glass scale 23 is l, the number of pulses obtained from the binarization circuit 29 when the galvanometer is rotated through the angle $\theta$ is N, and the interval between the grooves on the glass scale 23 is $\Delta x$, we obtain $$N\Delta x = l \tan \theta \qquad (3)$$

Substituting Eqaution (2) into Equation (3) yields $$q = \frac{lP}{\Delta x} \cdot \frac{1}{N} \qquad (4)$$

From Equation (4) it will be evident that, since the values l, P and $\Delta x$ are known, the shadow mask-to-faceplate distance can be calculated by counting the number of pulses, N, obtained from the binarization circuit 29 over the time period in which the laser beam transmitting the shadow mask is shifted by P on the faceplate. The counting of the pulses from the binarization circuit 29 is carried out by the signal processing unit 30.

The scanning distance of the laser beam on the faceplate is measured on the basis of the output I of the first photodetector 24 of FIG. 1. In this case, the scanning distance of the laser beam in a period from a maximum to the next maximum value of the output I corresponds to the pitch P/3 of the black stripes. If, therefore, the counting of pulses from the binarization circuit 29 is started at a point of time when the output I reaches a maximum value and terminated at a point of time when the output I reaches the next maximum value, q can be calculated using the number of pulses N' therebetween. However, the individual black stripe has a poor accuracy in comparison with that of the slots of the shadow mask 11. A high accuracy measurement can be assured if the number of pulses is counted over the time period in which the laser beam is shifted over a distance corresponding to the pitch P of the slots of the shadow mask 11. In this case, it is only necessary that CPU 30 start the count of the pulses from the binarization circuit 29 upon detection of the maximum value of the output I and terminate the count of the pulses upon detection of the third maximum value. As is evident from the waveform of the output I, the peak corresponding to the maximum value is readily affected by noises, thus producing an error in detection of the maximum value. It is desirable, therefore, that the shifting distance P of the laser beam be detected on the basis of portions of the waveform of the output I of the detector 24 that abruptly change in amplitude. For example, with an intermediate value between the maximum value and the minimum value of the output I used as a threshold value, P can be found by the number of times the output I crosses the threshold level.

A more exact measurement will be carried out by finding an autocorrelation function of the output waveform of FIG. 2 and counting the number of pulses over the period of the function. In this case, it is not necessary to find the autocorrelation function over a wide range. It will be sufficient if the autocorrelation function is found with respect to a narrow range including the value of P.

When the measurement is completed, the signal processing unit 30 delivers an instruction to a workpiece conveying device 33, bringing the next workpiece to a position to be measured.

Although in the above-mentioned embodiment a measuring system for measuring the incidence angle of the parallel beam on the shadow mask is provided, the incidence angle may be measured by an electrical signal supplied to the galvanometer mirror 18. The glass scale 23 and photodetector 25 may be replaced by a one-dimensional CCD (charge-coupled device) array.

FIG. 4 shows the schematic arrangement of the signal processing unit 30. The unit 30 comprises a central processing unit (CPU) 301, read only memory (ROM) 302 for storing a program and data necessary for measurement, random access memory (RAM) 303, interface 304 for supplying a signal to the galvanometer mirror driver 32, interface 305 for supplying a digital value from the A/D converter 27 to CPU 301, interface 306 for supplying output pulses of the binarization circuit 29 to CPU 301, and interface 307 for supplying the results of measurement to the display 31. CPU 301, ROM 302, RAM 303, and interfaces 304 to 307 are interconnected by a system bus 308.

Figure 5:
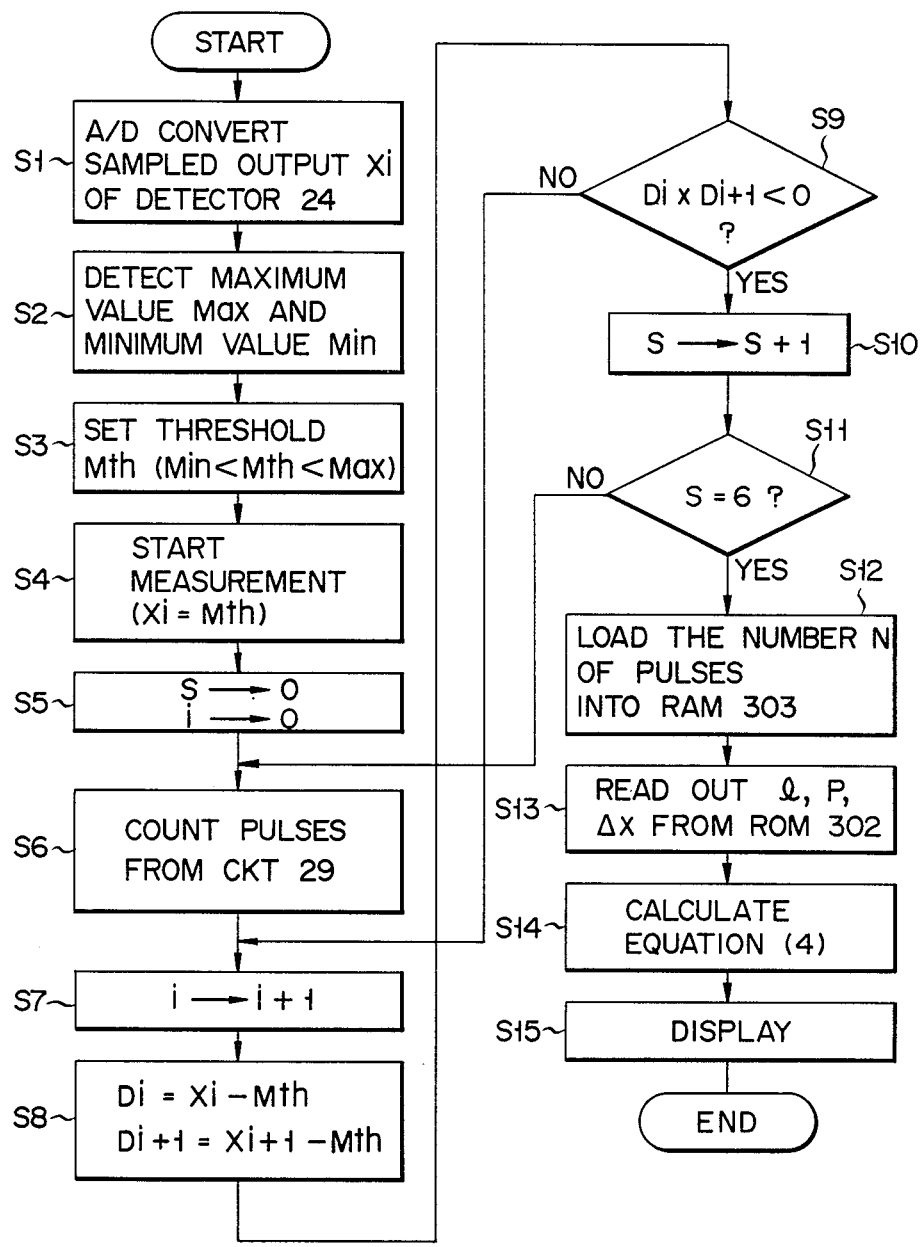
FIG. 5 shows a flow chart for explaining the operation of the signal processing unit.

The unit 30 performs a measuring operation according to a flow chart shown in FIG. 5. At first, CPU 301 reads a program out of ROM 302 and supplies a signal through the interface 304 to the driver 32, vibrating the galvanometer mirror 18. In step S1, the A/D converter 27 converts the output of the photodetector 24 to a digital signal for each sample. The digital signal is fed through the interface 305 to CPU 301. In step S2, CPU 301 detects a maximum value Max and minimum value Min of the output of the photodetector 24 which is shown in FIG. 2. Then, CPU 301 sets any intermediate value between the maximum value Max and the minimum value Min as a threshold value Mth, permitting the threshold value to be stored in RAM 303. In this way, the preparation for the measurement is made.

Then, CPU 301 starts a measuring operation at a point of time when the output of the A/D converter 27 crosses the threshold level Mth (step S4). In step S5, a counter S for counting the number of times the output of the A/D converter crosses the threshold level Mth, and a counter i for counting the number of samples are reset to zero. These counters are provided in CPU 301. In step S6, at a point of time when the output of the A/D converter 27 crosses the threshold level Mth, CPU 301 starts to count the number of pulses, N, from the binarization circuit 29. In step S7, the counter i is incremented by 1 each time fresh data is received from the A/D converter 27. In step S8, differences between digital values Xi, Xi+2 of the adjacent two samples and the threshold value Mth are calculated as Di, Di+1. In step S9, judgement is made as to whether or not the output of the detector 24 crosses the threshold level. This judgement is made dependent upon whether or not Di×Di+1<0. When the output of the detector 24 crosses the threshold level, the signs of Di, Di+1 are different and thus Di×Di+1<0. If, in step S9, Di×Di+1<0, in step S10 the counter S is incremented by 1. If, on the other hand, in step S9 the answer is "NO", the process goes back to step S7. In step S11, judgement is made as to whether or not S=6, i.e., whether or not the output of the detector 24 crosses the threshold level Mth six times from the start of measurement. When in step S11 the count value of the counter S is judged as being "6", the counting of pulses from the binarization circuit 29 is stopped and in step S12 the number N of pulses from the binarization circuit 29 which have been obtained so far is loaded into RAM 303. If, in step S11, the answer is "NO", the process goes back to step S6 and the counting of pulses is continued. In step S13, the known values l, P, Δx are read out of ROM and the number of pulses counted is read out of RAM. In step S14, the shadow mask-to-faceplate distance q is calculated on the basis of Equation (4). The result of calculation is displayed by the display 31.

Figure 6:
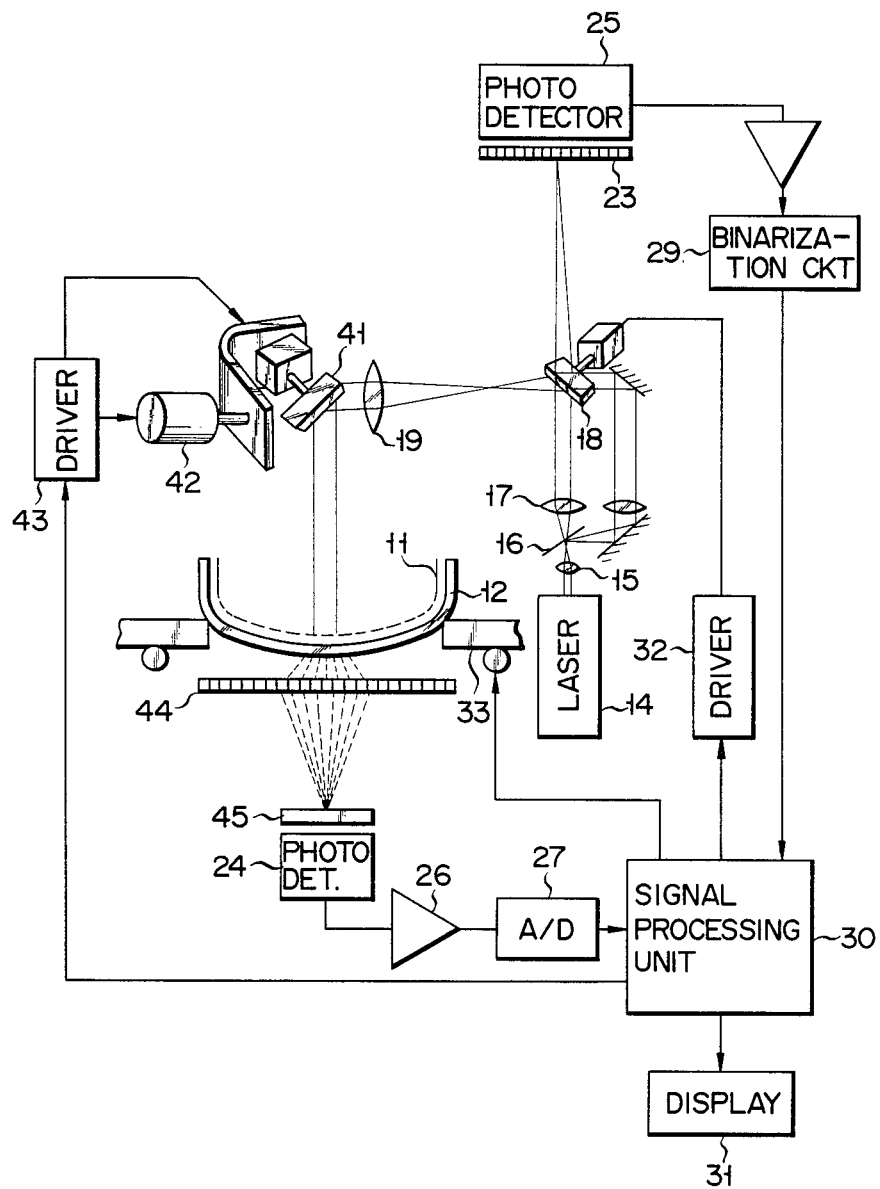
FIG. 6 shows an apparatus according to another embodiment of this invention.

FIG. 6 shows a measuring apparatus according to another embodiment of this invention which is adapted to measure the entire surface of a shadow mask/faceplate assembly fixed. In FIG. 6, like reference numerals are employed in FIG. 6 to designate like parts or elements shown in FIG. 1 and further explanation is therefore omitted. In FIG. 6, a galvanometer mirror 41 for deflecting laser beam is disposed in the neighborhood of the center of curvature of the curved surface of faceplate 12 and adapted to be driven by a motor 42 to provide a two-dimensional scanning of laser beam. The galvanometer mirror 41 and motor 42 are adapted to be driven by a driver 43 responsive to signal processing unit 30. The laser beam passed through the shadow mask 11 and faceplate 12 is conducted through a light condenser 44, such as a Fresnel lens, to the photodetector 24. For the photodetector 24 not to receive external light at this time, an interference filter 45 is used to direct only the laser beam to the photodetector 24.

In the above-mentioned distance measuring apparatus, it becomes possible to measure a black stripe pattern by alternating a method of processing a signal obtained from the photodetector 24.

A pattern measuring apparatus according to another embodiment of this invention will be explained below with reference to FIG. 7, in which like reference numerals are used to designate like parts or elements of FIG. 1.

Figure 7:
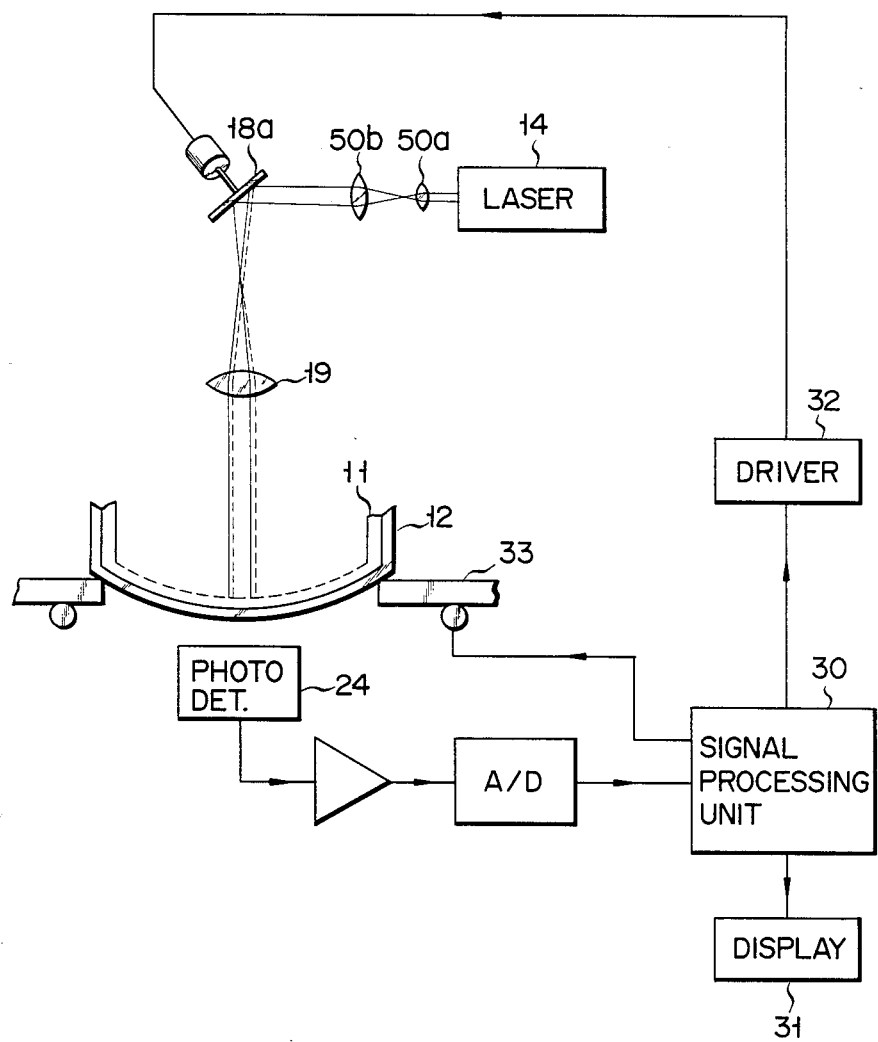
FIG. 7 is a diagrammatic view showing an apparatus according to this invention which measures the size of a pattern element on the inner surface of the faceplate.

In FIG. 7, a laser beam from laser beam source 14 is directed to a galvanometer mirror 18a through collimator lens 50a, 50b so that it is reflected to an object to be measured, through a lens 19. Like the embodiment of FIG. 1, the laser beam which is reflected by the galvanometer mirror 18a is focused before the lens 19, so that the workpiece is irradiated with a parallel beam. An incidence angle of the parallel laser beam on the object is varied by the galvanometer mirror 18a responsive to the signal processing unit 30.

Figure 8:
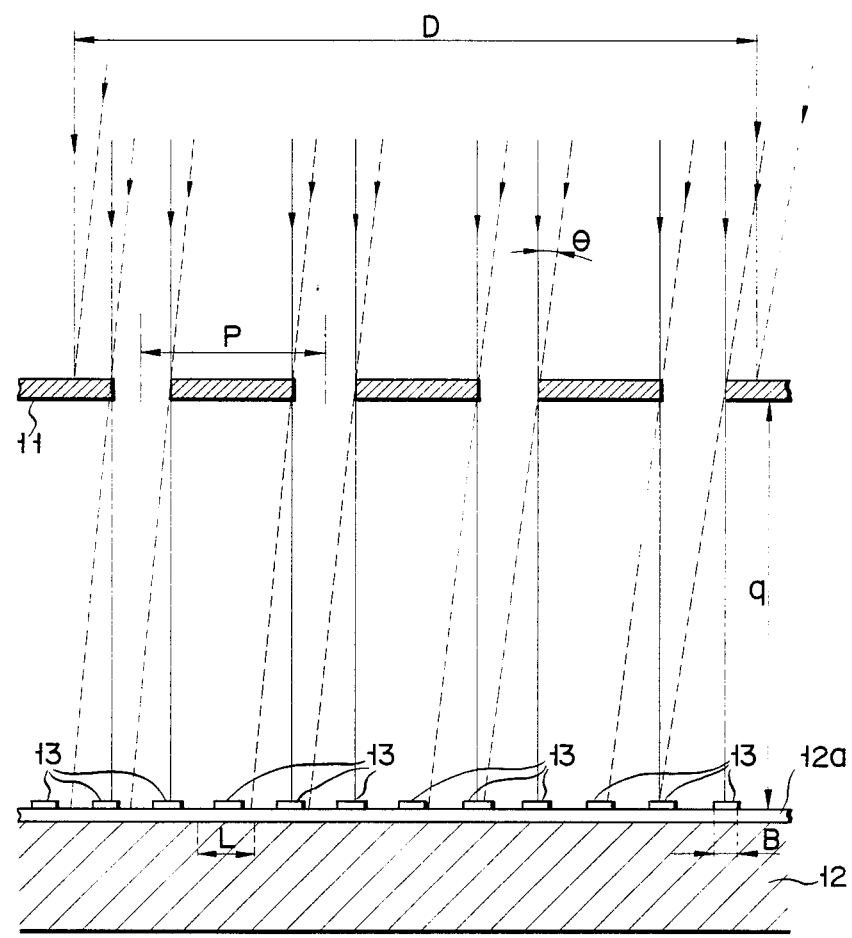
FIG. 8 shows an aperture pattern of the shadow mask and a black striped pattern on the faceplate.
Figure 8:
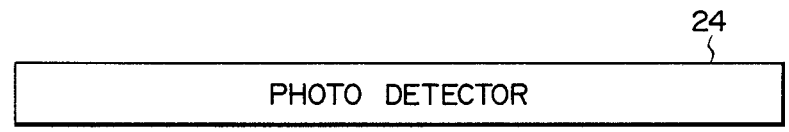
Figure 10:
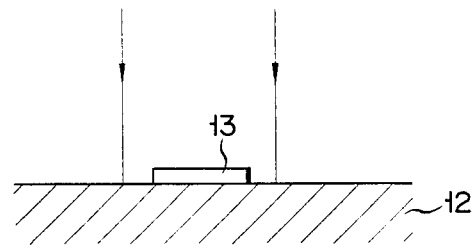
FIGS. 10, 11, and 12, each, show a view for explaining a principle on which the size of a pattern is measured according to the embodiment of this invention.
Figure 11:
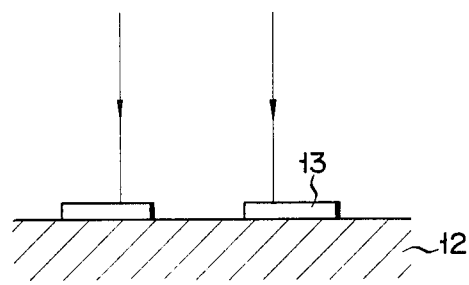

FIG. 8 shows the relationship between the diameter of the parallel beam and the shadow mask-to-faceplate assembly. The diameter D of the laser beam is 2 to 3 mm; the slot pitch P of the shadow mask 11, 750 μm; and the pitch L of the black stripes 13 on the faceplate 12, 250 μm. As is evident from FIG. 8, only the laser beam passed through the slots of the shadow mask 11 illuminates the phosphor screen on the faceplate and only the laser beam illuminating the phosphor stripes between the black stripes 13 reaches the photodetector 24 through the faceplate 12. A diffusing surface 12a is provided on the inner surface of the faceplate 12, in order for the inside of the faceplate to be invisible from outside. The presence of the diffusing surface 12a assures a better color reproduction and prevents the phosphor screen from scaling off. Due to the presence of the diffusing surface 12a, the measuring of the pattern cannot be effected by a Fourier diffraction using a coherent beam. According to this invention, the measuring of the pattern is carried out based on the maximum and minimum values of the light beam transmitting the faceplate, without being affected by the diffusing surface 12a. When the laser beam passed through the slots is incident mainly on the black stripes 13 as shown in FIG. 10 the quantity of transmitted light becomes minimal. When the laser beam is incident mainly on the phosphor stripes between the black stripes 13 as shown in FIG. 11 the quantity of transmitted light becomes maximal.

The measuring of the pattern according to this invention will be explained hereinafter.

With f(x) representing the Fresnel diffraction pattern of the shadow mask 11 and g(x) the pattern of the black stripes 13 (showing a distribution of light-transmitting areas), the quantity of light reaching the photodetector 24 through the faceplate 12 is given by $$I(\tau) = \int_{-a}^{a} f(x - \tau)g(x)dx \quad (5)$$

where a:
D/2

$\tau$: the distance between the shadow of shadow mask projected onto the faceplate by the parallel laser beam incident on the shadow mask along the normal thereof and that by the parallel laser beam incident on the shadow mask at an angle of $\theta$ with respect to the normal, the distance $\tau$ being given by $\tau = q \tan \theta$ as described above.

By the quantity I(0) of transmitted light which is obtained when the parallel laser beam is vertically incident on the shadow mask 11, I($\tau$) is normalized as follows:

$$\phi(\tau) = \frac{I(\tau)}{I(0)} \quad (6)$$

Since the beam diameter D is sufficiently great compared with the slot pitch P of the shadow mask, we obtain, $$\phi(\tau) = \frac{\int_{-\frac{P}{2}}^{\frac{P}{2}} f(x - \tau)g(x)dx}{\int_{-\frac{P}{2}}^{\frac{P}{2}} f(x)g(x)dx} \quad (7)$$

$\phi(\tau)$ is not dependent upon the beam diameter.

Figure 9:
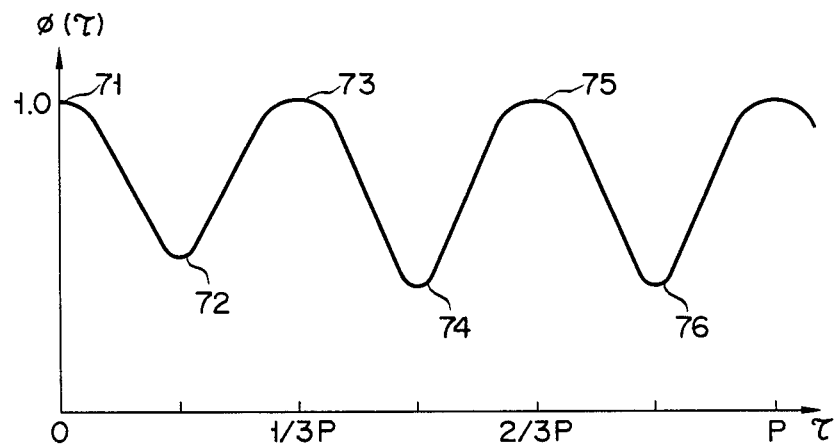
FIG. 9 shows an electric signal from a photodetector of FIG. 7.

The function, g(x) representing the pattern of shadow mask is a two-valued function having a period of one-third of the slot pitch P of the shadow mask 11. The function, f(x), on the other hand, shows a Fresnel diffraction pattern. The results of calculation of Eq. (7) are shown in FIG. 9.

As evident from FIGS. 10 and 11, the output of the photodetector 24 is influenced by the center position and interval of the black stripes, as quantitatively explained below. The Fresnel diffraction pattern of the shadow mask 11 at the inner surface of the faceplate 12 is very complicated, but can be approximated by a trigonometric function.

Figure 12:
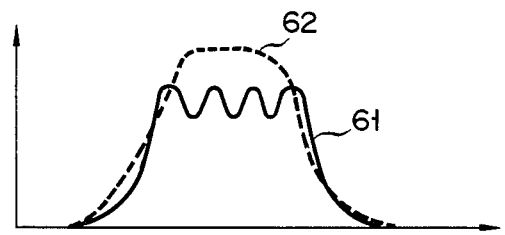

In FIG. 12, the solid line 61 shows a Fresnel diffraction pattern of the shadow mask and the dotted line 62 a pattern approximated by the trigonometric function.

Supposing that the Fresnel diffraction pattern f(x) is approximated by, e.g., 1+cos ax, the ratio R between the maximum value and the minimum value of Equation (7) in the positional relationship shown in FIGS. 10 and 11 is given by $$R \approx \frac{\frac{\alpha a}{\pi} \cdot \sin \frac{\pi}{2} \cdot \frac{B}{\alpha a} + \alpha a - \frac{B}{2}}{\frac{\alpha a}{\pi} \cdot \sin \frac{\pi}{2} \cdot \frac{\frac{P}{3} - B}{\alpha a} + \frac{\frac{P}{3} - B}{2}} \quad (8)$$

where
a: the width of slots of the shadow mask
$\alpha$: a coefficient used in approximating the Fresnel diffraction as the trigonometric function.

When we put $\alpha = 0.76$ at q = 10 mm, the calculated value of Equation (8) was in best agreement with the ratio between the maximum value and the minimum value as calculated by using the Fresnel diffraction pattern. The trigonometric function for approximation is considered as the first order component of the Fresnel diffraction pattern.

Figure 13:
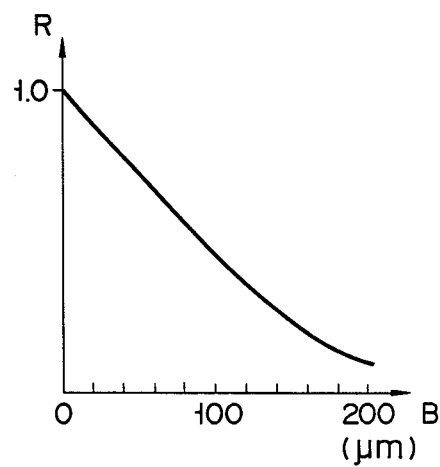
FIG. 13 shows a relationship of the width of the black stripes to a maximal-to-minimal value ratio, as shown in FIG. 9.

In Equation (8), the values $\alpha$, a, P are known values and B denotes the width of the black stripes. With B as a variable, R is as shown in FIG. 13. From the graph of FIG. 13 is will be understood that, if the ratio R between the maximum value and the minimum value of $\phi(\tau)$ is found, the width B of the black stripes is also evaluated.

As the incidence angle $\theta$ of the parallel beam on the shadow mask 11 varies, as mentioned above, with a slight rotation of the galvanometer mirror 18a, the output waveform of the photodetector 24 varies as shown in FIG. 9. The widths of the black stripes corresponding to red, green and blue phosphor stripes are obtained from the three sets of maximum and minimum values as shown in FIG. 9. For example, the width of the black stripe corresponding to the red phosphor is obtained from the ratio between the values at points 71 and 72 in FIG. 9, the width of the black stripe corresponding to the green phosphor from the ratio between the values at points 73 and 74, and the width of the black stripe corresponding to the blue phosphor from the ratio between the values at points 75 and 76 in FIG. 9.

The amount of shift, $\tau$, of the shadow of the shadow mask which is projected onto the faceplate corresponds to the incidence angle $\theta$ of the parallel beam on the shadow mask, i.e., the angle of rotation of the galvanometer mirror. The correspondence of the black stripe now being measured to any specific phosphor stripe can be found from the rotational angle of the galvanometer mirror 18a, which is given by the signal processing unit 30.

The signal processing unit 30 of the pattern measuring apparatus is arranged as shown in FIG. 4. For measurement of the pattern, ROM 302 stores a data table representing the R-B curve shown in FIG. 13.

Figure 14:
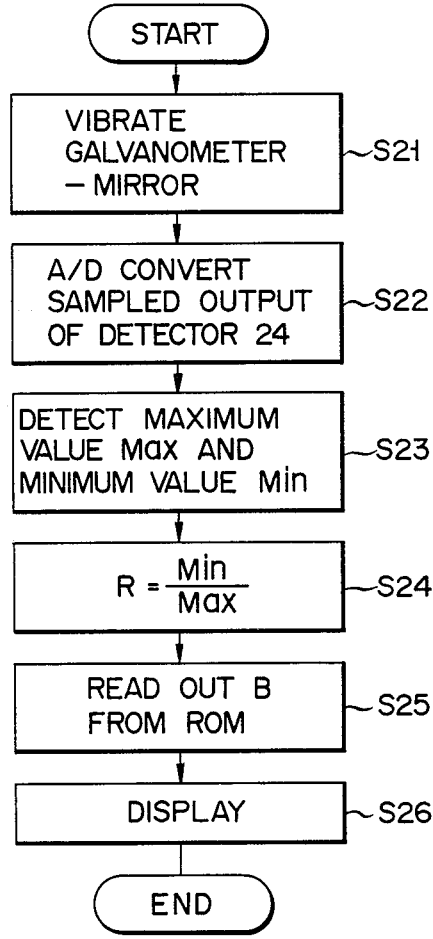
FIG. 14 is a flow chart explaining the operation of a signal processing unit of FIG. 7.

The pattern measuring operation will be explained below, with reference to the flow chart of FIG. 14. CPU 301 reads programs out of ROM 302 to start the operation. In step S21, CPU 301 vibrates the galvanometer mirror 18 through the interface 304. At step S22, CPU 301 receives an output signal of A/D converter 27 through the interface 305. In step S23, the maximum value Max and minimum value Min of the waveform shown in FIG. 9 are detected and, in step S24, the ratio R between the the maximum value Max and minimum Min is calculated. In step S25, the width B of the black stripe is read out of ROM 302, whose address designated by the calculated ratio value. In step S26, the width B of the black stripe which is so read out is displayed on the display 31.

Like the embodiment of FIG. 6, the apparatus of FIG. 7 can be so constructed that the entire surface of a shadow mask can be scanned with a laser beam.

Figure 15:
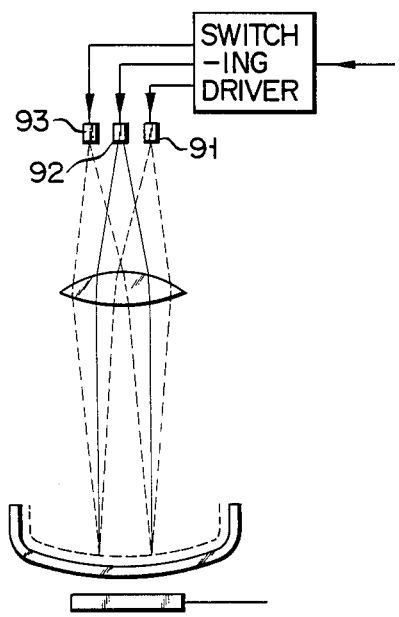
FIG. 15 shows a distance measuring apparatus according to another embodiment of this invention.
Figure 16:
FIG. 16 shows an arrangement of the light sources.

FIG. 15 shows an apparatus according to another embodiment of this invention, which can vary an incidence angle of a parallel beam on the shadow mask. According to this embodiment, a plurality of light sources such as light-emitting diodes or semiconductor lasers, e.g., three light sources 91, 92, 93, are provided. These light sources are sequentially switched by a switching driver which is responsive to the signal processing unit. If the light sources 91, 92, 93 are arranged as shown in FIG. 16, it is possible to measure the diameter of phosphor dots on the faceplate of a black matrix type color picture tube.

Although the optical measurement of the shadow mask-to-faceplate distance and that of the pattern size of the phosphor screen on the inner face of the faceplate have been explained above, the apparatus of this invention can also be applied to the measurement of the color picture tube of, for example, a color liquid-crystal (LC) video display device.

The color L/C video display device is disclosed in "B/W and Color LC Video Displays Addressed by Poly Si TFTs" (1983, SID International Symposium Digest of Technical Papers, 14.7). This device comprises a pair of parallel upper and lower substrates and polarizers between which the substrates are sandwiched. R.G.B. color filter stripes and transparent pixel electrodes are regularly arranged on the inner faces of the upper and lower substrates, respectively. A twisted-nematic liquid cyrstal (TN-LC) is filled between the upper and lower substrates. Back light is illuminated through the polarizer onto the lower substrate. If an assembly of the upper and lower substrates of the color LC display device is used, as a sample to be measured, on the apparatus of FIGS. 1 and 6, it is possible to measure the substrate-to-substrate distance. The width of the color filter stripes or the pixel electrodes of the assembly can be measured by the apparatus shown in FIG. 7. In other words, it is possible to measure a defect of the grating of the color filter stripes with respect to the grating of the pixel electrodes. If, on the other hand, the grating of the color filter stripes is used as a reference grating, it is also possible to detect a defect of the pixel electrodes.

According to this invention, the size (defect) of resistance elements of a grating-like array on a substrate of a thermal head can be measured based on a mask (reference grating) which is used for forming these resistance elements. It is also possible to measure a distance between the elements of two gratings mutually associated in their periodicity, as well as to measure the size of grating elements for forming one grating on the basis of the other grating.

What is claimed is:
1. An apparatus for measuring the distance between first and second grating-like structures each having periodic pattern elements or the size of the pattern elements of said second grating-like structure comprising:
a light source;
an optical system located between said light source and an assembly of said first and second grating-like structures for applying to said first grating-like structure substantially parallel rays of light having a diameter greater than the pitches of said pattern elements of said first and second grating-like structures, said optical system being arranged to vary an incident angle of substantially parallel rays of light to said first grating-like structure;
a photodetector means for detecting light passed through said first and second grating-like structure assembly to produce an electric signal having an amplitude corresponding to a quantity of light passed through said assembly; and
a signal processing unit for driving said optical system to vary the incident angle of the parallel rays of light to said first grating-like structure and evaluating a measurand of said first and second grating-like structure assembly on the basis of the electric signal from said photodetector means whose amplitude periodically varies with variation in the incident angle of the parallel rays of light.

2. The apparatus of claim 1, wherein said first and second grating-like structures are a shadow mask and a faceplate of a color picture tube, respectively, said shadow mask having a periodic pattern of slots and said faceplate having a periodic pattern of black stripes formed on the inner surface thereof.

3. The apparatus of claim 1, in which said signal processing unit is arranged to measure the distance between said first and second structures on the basis of amount of the variation of the incident angle of the parallel rays to said first structure through said optical system over N (an integer) cycle periods of the electric signal from said photodetector means.

4. The apparatus of claim 3, which comprises incident-angle variation detecting means optically coupled to said optical system for producing a one-shot pulse each time the incident angle of the parallel rays to said first structure from said optical system varies by a predetermined amount, and in which said signal processing unit is arranged to count pulses from said incident-angle variation detecting means over the N cycle periods of the electric signal from said photodetector means to evaluate the distance between said first and second structures.

5. The apparatus of claim 3, which comprises incident-angle variation detecting means optically coupled to said optical system for producing a one-shot pulse each time the tangent of the incident angle of the parallel rays to said first structure from said optical system varies by a predetermined amount, and in which said signal processing unit is arranged to count pulses from said incident-angle variation detecting means over the N cycle periods of the electric signal from said photodetector means to evaluate the distance between said first and second structures, and in which said optical system includes a half mirror for dividing a light from said light source into first and second parts and a galvanometer mirror for varying the incident angle of the parallel rays of light to said first structure, said galvanometer mirror having first and second reflecting surfaces which rotate synchronously in response to said signal processing unit, said optical system being arranged to reflect the first part of light from said half mirror toward said first and second structure assembly by said first reflecting surface of said galvanometer mirror and reflect the second part of light from said half mirror toward said incident-angle variation detecting means via said second reflecting surface of said galvanometer mirror; and said incident-angle variation detecting means includes a scale for receiving the second part of light from said half mirror, said scale being located at a position at which the second part of light is focused and having light-scattering graduations formed thereon at a predetermined interval, and circuit means coupled to said scale for producing an output pulse each time the second part of light is shifted on said scale by a predetermined distance corresponding to the predetermined interval of said graduations.

6. The apparatus of claim 1, in which said signal processing unit is arranged to detect a maximum and a minimum value of the electric signal from said photodetector over one cycle thereof, calculate a ratio between the maximum value and the minimum value and evaluate the size of the pattern elements of said second structure on the basis of the calculated ratio.

7. The apparatus of claim 6, in which said signal processing unit comprises a memory for storing a data table showing a previously measured relationship of the ratio between the maximum value and the minimum value of the electric signal to the size of the pattern elements of said second structure, and the size of said pattern elements of said second structure being measured is extracted from a location of said memory which is addressed by the calcualted ratio between the maximum value and the minimum value of the electric signal.

8. The apparatus of claim 1, in which said optical system includes a galvanometer mirror for directing the light from said light source to said first and second structure assembly, a first converging lens system arranged between said galvanometer mirror and said first and second structure assembly and having a primary focal point on the side of said galvanometer mirror, and a second lens system arranged between said light source and said galvanometer mirror to permit the light to be focused at the primary focal point of said first converying lens system after being reflected by said galvanometer mirror so that said first and second structures are illuminated with parallel rays of light.

9. The apparatus of claim 2, in which said shadow mask has slots formed at a pitch P and said faceplate has a phosphor screen having a pattern of black stripes formed at a pitch of ⅓ P.

10. The apparatus of claim 1, in which said light source is a laser beam source.

* * * * *